Jan. 22, 1957  W. SCHNEIDER  2,778,926
METHOD FOR WELDING AND SOLDERING BY ELECTRON BOMBARDMENT
Filed Sept. 4, 1952  2 Sheets-Sheet 1

INVENTOR.
WILHELM SCHNEIDER
BY Michael S. Striker
Agt.

Jan. 22, 1957   W. SCHNEIDER   2,778,926
METHOD FOR WELDING AND SOLDERING BY ELECTRON BOMBARDMENT
Filed Sept. 4, 1952   2 Sheets-Sheet 2

INVENTOR.
WILHELM SCHNEIDER.
BY Michael S. Striker
Agt.

United States Patent Office 2,778,926
Patented Jan. 22, 1957

2,778,926

METHOD FOR WELDING AND SOLDERING BY ELECTRON BOMBARDMENT

Wilhelm Schneider, Frankfurt am Main, Germany, assignor to Licentia Patentverwaltungs G. m. b. H., Berlin-Grunewald, Germany Application September 4, 1952, Serial No. 307,943

Claims priority, application Germany September 8, 1951

4 Claims. (Cl. 219—117)

The present invention relates to a method for welding and soldering by bombarding by electrons the engaging surfaces of two parts to be connected.

It is the object of the present invention to solder, weld, or sinter suitable materials by heating the parts to be connected by a beam of electrons.

It is a further object of the present invention to attach a contact to a crystal by heating abutting surface portions of the same by a beam of electrons in order to form a system having a uni-directional electric conductivity.

With these objects in view the present invention mainly consists in a method for producing a fixed connection between two bodies by soldering or welding comprising the step of bombarding portions of said bodies by electrons so as to heat said portions of said bodies, and joining said portions of said bodies.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
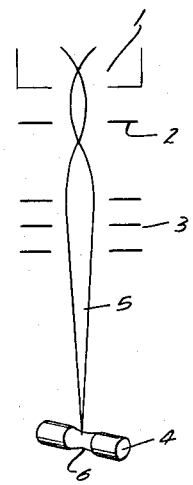
Fig. 1 is a schematic view of an arrangement for focussing a beam of electrons onto a work piece.
Figure 2:
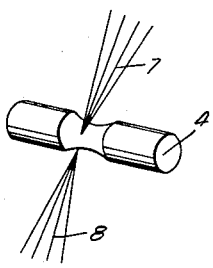
Fig. 2 is an isometric view of a work piece being shaped by two beams of electrons.
Figure 3:
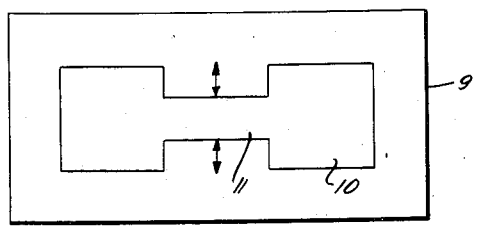
Fig. 3 is a plan view of a crystalline foil.

Referring now to the drawings, and more particularly to Figs. 1 to 3, a beam of electrons 5 emitted by an electron-discharging device including a cathode 1 and an anode 2 is focussed by electric focussing means 3 onto the work piece 4. During rotation of the work piece 4 a groove 6 is formed since the surface layer bombarded by the electrons is evaporated. It is, for instance, possible to reduce the diameter of a cylindrical metal rod from one millimeter to a diameter of one tenth millimeter.

According to the arrangement shown in Fig. 2, two beams of electrons 7 and 8 engage the work piece on opposite sides, the beam 7 extending nearly tangentially to the upper surface and the beam 8 extending nearly tangentially to the lower surface. In a similar manner, more than two beams of electrons extending tangentially to the surface of the work piece may be applied.

Fig. 3 shows a crystalline semi-conductive foil 10 mounted on a supporting surface 9. The narrow bridge portion 11 is produced by bombarding the foil by electrons so as to evaporate portions of the same. The two opposite recesses in the foil are either produced by covering the bridge portion of the foil and by moving a single beam of electrons across the cover and the foil, or by two moving beams of electrons which are reversed at the edges of the bridge portion.

In carrying out the bombarding of the material by electrons, one or several electron discharging devices may be provided which may be arranged in one plane. The beams of electrons may be deflected singly or in groups, and in the event that the electron discharging devices are not located in one plane, may be deflected by electric or magnetic fields into one plane. The electron discharging devices are preferably arranged in diametrically located pairs. It is, however, also possible to divide a beam of electrons emitted by a single electron discharging device into several small beams which are directed to different surface portions of the material to be treated.

The cross-sectional shape of beams of electrons is preferably varied by diaphragms provided with suitably shaped apertures. It is also advantageous to produce several beams of electrons and to direct such beams consecutively in a predetermined and variable order against the material to be treated.

Preferably means are provided for varying the intensity of the beams of electrons gradually or step by step.

Mechanical, electrical, or magnetic means are provided for holding and moving the work piece in a vacuum. Preferably such means are rotatable or slidable and capable of supporting a plurality of semi-conductive bodies for simultaneous treatment by beams of electrons.

Preferably the work piece is heated by suitable heating means in a vacuum after the electron bombardment in order to retain the crystal structure thereof. It is advantageous to provide heating means producing different temperatures in different places.

Semi-conductive bodies, foils, and surface layers thereof which have been treated according to the method of the present invention are particularly suited for use as controlled semi-conductors, such as transistors, and for crystal rectifiers.

The focussing means for forming a concentrated beam of electrons may be single lenses or immersion lenses of the electric or magnetic type, as well as electron-optical prisms.

By the same method crystal systems of uni-directional electric conductivity may be produced which are provided with pointed contacts, contacts having an edge, or contacts engaging along a line. Recesses for such contacts are produced in a vacuum by bombarding by electrons the surface portion of a body consisting of a crystalline semi-conductive material so that a surface layer portion is evaporated. By the method of the present invention recesses may be formed without producing any impurities. Drilling or milling according to the known methods causes particularly in germanium and silicon a change of the concentration of the disturbance centres and blocking properties near the surface which is detrimental for the use of the crystal for systems of uni-directional electric conductivity.

For forming the recesses several beams of electrons may be focussed on one surface portion, or a beam of electrons, produced by a single electron discharging device, may be divided into several beams for bombarding the body to be treated on different spots. Preferably means are provided for directing several beams of electrons consecutively and in a predetermined order against the material to be treated. Again, means may be provided for varying the intensity of the beams and the cross-section thereof, and preferably the semi-conductive crystals are tempered after the bombardment.

In order to improve the electric operation of the system, it is advantageous to electrically form each contact and to connect the contacts electrically as required by the purpose of the system.

Semi-conductive bodies treated according to the present invention are particularly suited for the production of diodes, transistors, or other controlled semi-conductive systems having one or several contacts.

Figure 4:
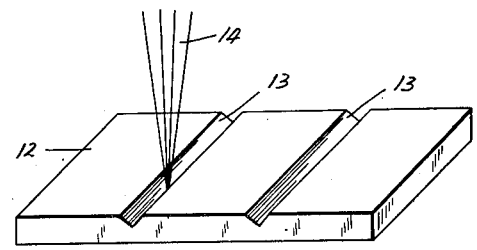
Fig. 4 is an isometric view of a crystalline body in which grooves are formed by a beam of electrons.
Figure 5:
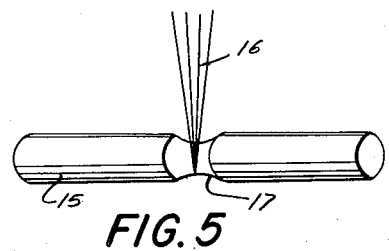
Fig. 5 is an isometric view similar to Fig. 2.

Referring now to Fig. 4, a crystal 12 is provided with wedge-shaped recesses or grooves 13 for receiving contacts by bombarding the surface of the crystal 12 by electrons focussed in a beam 14 which causes evaporation of the material. Fig. 5 illustrates a cylindrical crystal body 15 in which a peripheral groove 17 is formed by evaporation of a surface layer by a nearly tangentially extending beam of electrons 16. The contact is then mounted in the groove 17.

A further advantageous application of the method is the melting of highly purified materials which easily react with other substances. It is very difficult to find a support for the material to be melted which does not react with the material when the material and the support are heated as it is the case in the known methods. This fact is particularly disadvantageous when semi-conductive materials such as silicium or germanium are melted which are to be used for systems of uni-directional electric conductivity such as diodes, transistors or rectifiers. In such systems the distribution of the concentration of the disturbance centres and blocking portions is of greatest importance, and the known melting processes cause uncontrollable changes of the concentration of the disturbance centres and blocking properties of crystalline materials of the type described.

By the present method semi-conductive materials, particularly for use as ball-shaped bodies for systems of uni-directional electrical conductivity, are melted by one or several beams of electrons. Since the beams of electrons can be exactly focussed, substantially only the material to be melted is heated.

Preferably a quantity of the material to be melted is placed on a horizontal supporting surface consisting of the same highly purified material as the material to be melted, or of a material which does not react with the melted material and is not soluble therein. The melted regulus assumes ball shape due to surface tension when placed on a horizontal and plane surface.

The melting process is carried out in a vacuum and in order to avoid entering of air into the vacuum an electron discharging device is used which permits directing of a beam of electrons by means of electric and/or magnetic fields consecutively onto separated quantities of material to be melted, or movable supporting means are provided.

Several beams of electrons may be focussed in one spot, or a single beam of electrons may be divided into beams. It is also advantageous to produce several beams of electrons and to direct the same consecutively, and preferably in a variable order, onto the material to be melted. Thereby, a uniform heating of the material is obtained, while the supporting material is not exposed to the electrons and remains at substantially the same temperature.

Any possible influence of the supporting material may be avoided by moving the material to be melted relatively to the beams of electrons by allowing it to drop due to the force of gravity.

Preferably, means are provided for regulating the intensity of the beams of electrons gradually or step-wise, in order to influence the solidifying of the melted material. It is also advantageous to provide heating means in the area of the electron discharging device in which the melted material is heated and tempered after the electron bombardment. Preferably the support for the melted material is movably mounted so that the melted material may be moved into the heating device in which areas of different temperatures are provided.

Figure 6:
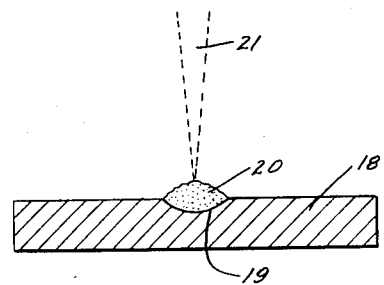
Figs. 6 and 7 are cross-sectional views illustrating the melting of a quantity of a crystalline powderized material.
Figure 7:
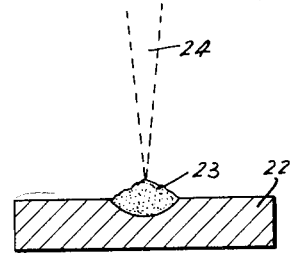

Referring now to Figs. 6 and 7, support 18 of highly purified carbon is provided with a recess 19 in which a quantity of powderized crystalline material 20, such as germanium powder, is arranged, which is melted by the beam of electrons 21. In Fig. 7, the support 22 consists of highly purified silicium on which a quantity of silicium powder 23 is arranged and melted by a beam of electrons 24.

Figure 8:
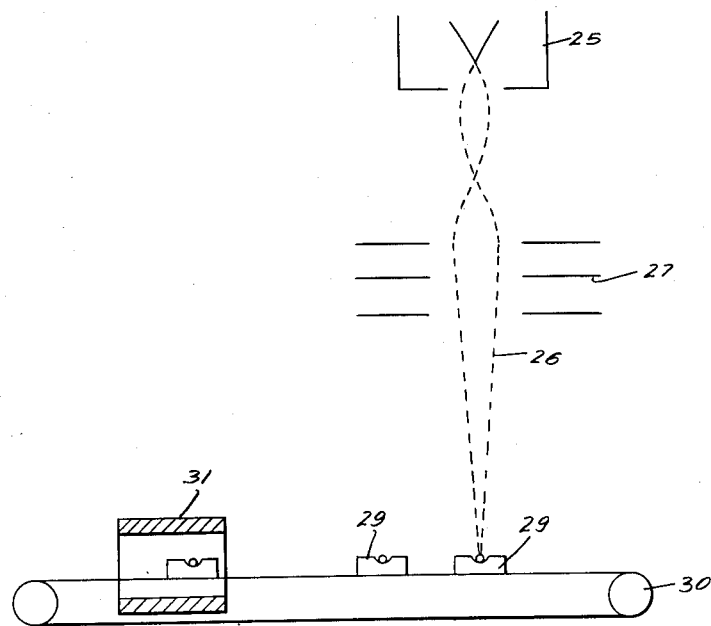
Fig. 8 is a schematic sectional view illustrating an arrangement for melting and tempering a crystalline semi-conductive material.

Fig. 8 illustrates an arrangement for melting and tempering which is enclosed in a suitable means for providing a vacuum. An electron-discharging device 25 emits a beam of electrons 26 which are focussed by electronic focussing means 27 onto an endless conveyor band 28. Supports 29 are mounted on the conveyor band 28 which is driven by roller 30 and moves the supports 29 carrying the material to be melted first into the beam of electrons 26 and then into the heating device 31 in which the melted material is tempered. During further movement of the conveyor band, the ball-shaped solidified bodies fall into a container 32.

The method is also advantageously applied in a process for purifying crystalline substances. During the solidifying and crystallization of melted crystalline substances, the surface layer of a melted regulus crystallizes last, and therefore contains an amount of impurities which is high compared with the inner portion of the regulus. Mechanical or chemical or electro-chemical removal of such surface layers leads to the adding of further impurities.

According to a modified method crystalline substances are purified by bombarding by electrons the surfaces of reguli in a vacuum. Thereby the outermost surface layer which contains most of the impurities is evaporated and removed in such a manner that no impurities are added. Thereupon the reguli are again melted and solidified so that the remnant of impurities still contained in the reguli are again deposited in the outermost layer during the crystallization process. Such outermost layer is again removed by an electron bombardment.

The known processes for making electrical precision contacts or other mechanical connections of very small parts have the disadvantage that it is difficult to find soldering or welding tools having a sufficient heat capacity but being small enough for soldering very small parts. The known tools have the further disadvantage that simultaneously with the parts to be soldered, other parts of the electrical or mechanical system are heated and subject to changes such as melting or crystallizing which seriously impairs the use of such parts for electrical or mechanical arrangements.

According to the present method electrical or mechanical connections are produced by welding, soldering, sintering or similar processes in such a manner that the parts to be connected are brought into contact and heated by a beam of electrons for a short time.

This process may be applied for the making of bolometers, thermo elements or other connections for electrical or mechanical purposes, for instance in precision instruments such as galvanometers and measuring instruments provided with torsion filaments such as torsion scales.

A particularly advantageous use of the method is the producing of systems of uni-directional electric conductivity including crystals and contact means. The contact means are attached to the crystal by heating the point of contact by a beam of electrons for a short time. The crystals used consist of a semi-conductive material such as germanium or silicium.

It is advantageous to apply simultaneously direct- or alternating current through the contact spot in order to electrically condition the same.

The present method is also advantageously employed for alloying the surface of a metal or of a semi-conductive material. According to the known methods, it has been difficult to alloy two components while avoiding complete melting down of one component and keeping the thickness of the alloyed surface layer constant. According to the present method, a powderized quantity of one component is placed on the surface of the other component and then bombarded by electrons so as to form an alloy with a surface layer of the other component.

For instance, it is possible to alloy a surface layer of iron with aluminum, or a surface layer of germanium with bismuth. Another method is to condense one of the components from its vapor on the surface before treating the surface by bombardment.

It is obvious that more than two components may be alloyed. The substances which are to be added to the surface layer are consecutively applied to the same in powderized form and heated by an electron bombardment.

By a modified method semi-conductive crystalline materials which must have different conductive properties on a portion of the surface thereof and in the interior thereof are provided with surface layer portions having predetermined concentration of the disturbance centres and blocking properties by adding another substance to the surface layer of the same. Such other substance is applied to the surface of the semi-conductive material and thereupon bombarded by electrons or ions so as to at least partly enter the surface layer of the semi-conductive material.

In carrying out this process it is advantageous to heat and temper the semi-conductive material after the other substance has been added to the surface layer thereof. Preferably the direction of the blocking action of the blocking spot is determined by conducting an electric current through the same.

Preferably the other substance is applied to the surface of the semi-conductive material in a thin layer having a thickness of only a few atoms by dusting on or condensation of vapor. According to this method a substance which is to be alloyed with a surface layer of the semi-conductive material is at first applied to the same and then heated by a beam of electrons so as to enter the surface layer and to form an alloy. In the event that a beam of ions is used, ions of this beam remain in the surface layer of the semi-conductive material and serve as additional blocking spots. The permanent connection of the added substance with the crystal structure is improved by consecutive heat treatment.

In order to enable proper explanation of the present invention, the above specification includes descriptions of some process steps and other features essential to an understanding of the invention, which are not exclusively applicant's invention, but partly are known in this field, and partly were invented by other inventors alone.

Reference is being made for purposes of record to the co-pending patent applications Serial No. 307,941 filed on September 4, 1952 by W. S. Koch and Serial No. 307,942 filed on September 4, 1952 and now abandoned by W. S. Koch and H. U. Harten.

It will be understood that each of the elements described above, or two or more together, may also find a useful application in other types of methods for welding and soldering by electron bombardment differing from the types described above.

While the invention has been illustrated and described as embodied in a method for producing a system having a uni-directional electric conductivity by attaching a contact to a crystal by heating abutting surface portions of the same by a beam of electrons, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method for producing systems having a uni-directional electric conductivity including a crystal means consisting of a crystalline semi-conductive material from the group comprising silicon and germanium and a contact means, comprising the steps of attaching said contact means to said crystal means by joining surface portions of said crystal means and of said contact means; and bombarding said surface portions by electrons so as to heat the same and to produce a permanent connection between said surface layer portions.

2. A method for producing a germanium semi-conductor apparatus including crystalline germanium material and an electrically conductive contact means comprising, in combination, the steps of permanently attaching said electrically conductive contact means to said germanium material by placing selected surface portions of said electrically conductive contact means and said germanium material in contact with each other; and subjecting said selected surface portions to the action of a beam of electrons focused thereon so as to heat the same until a permanent connection between said selected surface portions is produced.

3. A method for producing a silicon semi-conductor apparatus including crystalline silicon material and an electrically conductive contact means comprising, in combination, the steps of permanently attaching said electrically conductive contact means to said silicon material by placing selected surface portions of said electrically conductive contact means and said silicon material in contact with each other; and subjecting said selected surface portions to the action of a beam of electrons focused thereon so as to heat the same until a permanent connection between said selected surface portions is produced.

4. A method for producing a germanium semi-conductor apparatus including crystalline germanium material and an electrically conductive contact means comprising, in combination, the steps of permanently attaching said electrically conductive contact means to said germanium material by placing said electrically conductive contact means and said germanium material under vacuum; placing selected surface portions of said electrically conductive contact means and said germanium material in contact with each other; and subjecting said selected surface portions to the action of a beam of electrons focused thereon so as to heat the same until a permanent connection between said selected surface portions is produced.

References Cited in the file of this patent

UNITED STATES PATENTS

| | | |
|---|---|---|
| 2,128,581 | Gardner | Aug. 30, 1938 |
| 2,267,714 | Borries | Dec. 30, 1941 |
| 2,267,752 | Ruska | Dec. 30, 1941 |
| 2,345,080 | Ardenne | Mar. 28, 1944 |
| 2,381,025 | Addink | Aug. 7, 1945 |
| 2,423,729 | Ruhle | July 8, 1947 |